United States Patent
Elshafie et al.

(10) Patent No.: US 11,923,990 B2
(45) Date of Patent: Mar. 5, 2024

(54) TECHNIQUES FOR TRIGGERING REFERENCE SIGNAL TRANSMISSION BASED ON DECODING PARAMETERS

(71) Applicant: QUALCOMM Incorporated, San Diego, CA (US)

(72) Inventors: Ahmed Elshafie, San Diego, CA (US); Yi Huang, San Diego, CA (US); Wei Yang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/473,443

(22) Filed: Sep. 13, 2021

(65) Prior Publication Data

US 2022/0103311 A1 Mar. 31, 2022

Related U.S. Application Data

(60) Provisional application No. 63/085,027, filed on Sep. 29, 2020.

(51) Int. Cl.

| H04L 1/1867 | (2023.01) |
|---|---|
| H04L 1/00 | (2006.01) |
| H04L 1/1607 | (2023.01) |
| H04L 1/1812 | (2023.01) |
| H04L 1/20 | (2006.01) |
| H04L 5/00 | (2006.01) |
| H04W 72/1263 | (2023.01) |
| H04W 72/23 | (2023.01) |

(52) U.S. Cl.
CPC .......... *H04L 1/1896* (2013.01); *H04L 1/0003* (2013.01); *H04L 1/1621* (2013.01); *H04L 1/1819* (2013.01); *H04L 1/203* (2013.01); *H04L 5/0051* (2013.01); *H04W 72/1263* (2013.01); *H04W 72/23* (2023.01)

(58) Field of Classification Search
CPC ....... H04L 1/16; H04L 1/1607; H04L 1/1621; H04L 1/1671; H04L 1/1685; H04L 1/1819; H04L 1/1896; H04L 1/20; H04L 1/203; H04L 5/0048–0051; H04L 5/0085; H04W 72/1263; H04W 72/14
See application file for complete search history.

(56) References Cited

U.S. PATENT DOCUMENTS

| 8,374,076 | B2 * | 2/2013 | Kim | ...................... | H04L 1/1607 370/210 |
|---|---|---|---|---|---|
| 2017/0118697 | A1 * | 4/2017 | Soldati | ................... | H04W 48/14 |
| 2020/0213067 | A1 * | 7/2020 | Cirik | ..................... | H04W 76/27 |
| 2021/0044343 | A1 * | 2/2021 | Onggosanusi | ....... | H04B 7/0695 |
| 2022/0109479 | A1 * | 4/2022 | Liu | ...................... | H04B 7/0636 |
| 2022/0345195 | A1 * | 10/2022 | Jang | .................. | H04W 72/1289 |
| 2023/0076250 | A1 * | 3/2023 | Harada | ................... | H04L 5/001 |

* cited by examiner

*Primary Examiner* — Pao Sinkantarakorn
(74) *Attorney, Agent, or Firm* — Arent Fox, LLP

(57) ABSTRACT

Aspects described herein relate to receiving one or more downlink transmissions from a base station, and transmitting, based on comparing one or more parameter values of the one or more downlink transmissions to one or more threshold values, a sounding reference signal (SRS) to the base station over uplink resources. Other aspects relate to receiving, from a user equipment (UE), feedback related to decoding one or more downlink transmissions, wherein the feedback includes an indication that the UE is transmitting a SRS, and receiving, based on the indication, the SRS from the UE over uplink resources.

29 Claims, 7 Drawing Sheets

TECHNIQUES FOR TRIGGERING REFERENCE SIGNAL TRANSMISSION BASED ON DECODING PARAMETERS

CLAIM OF PRIORITY UNDER 35 U.S.C. § 119

The present application for patent claims priority to Provisional Patent Application No. 63/085,027, entitled "TECHNIQUES FOR TRIGGERING REFERENCE SIGNAL TRANSMISSION BASED ON DECODING PARAMETERS" filed Sep. 29, 2020, which is assigned to the assignee hereof and hereby expressly incorporated by reference herein for all purposes.

BACKGROUND

Aspects of the present disclosure relate generally to wireless communication systems, and more particularly, to transmitting reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a base station or other network node can configure a user equipment (UE) to periodically transmit a sounding reference signal (SRS). The base station can receive the SRS and accordingly acquire channel state information (CSI) or other information from the UE based on the SRS, which the base station can use to modify resource scheduled for the UE or other communication parameters, etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to receive one or more downlink transmissions from a base station, and transmit, based on comparing one or more parameter values of the one or more downlink transmissions to one or more threshold values, a sounding reference signal (SRS) to the base station over uplink resources.

According to another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive, from a user equipment (UE), feedback related to decoding one or more downlink transmissions, wherein the feedback includes an indication that the UE is transmitting a SRS, and receive, based on the indication, the SRS from the UE over uplink resources.

According to another aspect, a method for wireless communication at a UE is provided that includes receiving one or more downlink transmissions from a base station, and transmitting, based on comparing one or more parameter values of the one or more downlink transmissions to one or more threshold values, a SRS to the base station over uplink resources.

In another aspect, a method for wireless communication at a base station is provided that includes receiving, from a UE, feedback related to decoding one or more downlink transmissions, wherein the feedback includes an indication that the UE is transmitting a SRS, and receiving, based on the indication, the SRS from the UE over uplink resources.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
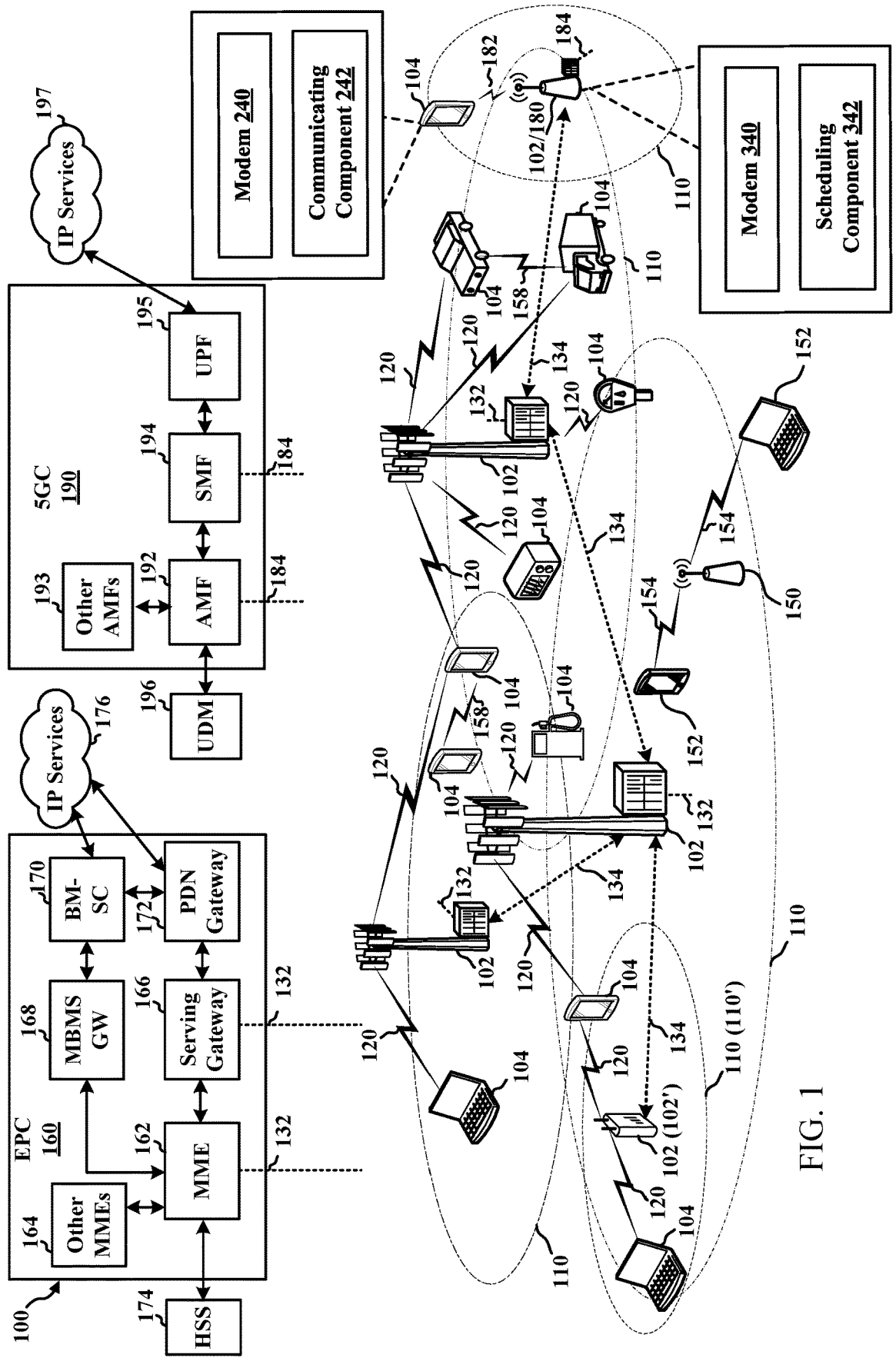
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to transmitting reference signals, such as sounding reference signals (SRS), by a user equipment (UE). In some radio access technologies, such as fifth generation (5G) new radio (NR), a base station may schedule the UE to transmit an aperiodic SRS (A-SRS) on physical uplink shared channel (PUSCH) using either the uplink (UL) or downlink (DL) grant. The UE can accordingly transmit the triggered A-SRS and the base station can use this transmission to acquire channel state information (CSI) about UL or DL channel. In one example, the base station can schedule a DL data transmission to the UE, and can receive a negative-acknowledgement (NACK) feedback from the UE for the DL data transmission. Then, the base station can use the next DL grant to trigger the A-SRS transmission, and obtain the CSI. In some instances, however, by the time the base station receives the SRS, there may not be enough time to use the acquired CSI to serve the retransmissions of the same data packet.

Accordingly, aspects described herein relate to allowing the UE to autonomously transmit aperiodic reference signals, such as A-SRS, to the base station. For example, the UE can be configured to autonomously transmit the aperiodic reference signals, such as A-SRS, to the base station based on values of one or more decoding parameters. For example, where the UE detects transmission of one or more NACK feedback to the base station over a period of time, it can transmit an aperiodic reference signal to the base station. In another example, where the UE detects a threshold modulation and coding scheme (MCS), log likelihood ratio (LLR), bit error rate (BER), signal-to-interference-and-noise ratio (SINR), etc. in communications with the base station, the UE can determine to transmit an aperiodic reference signal to the base station. In an example, the UE can notify the base station of the upcoming aperiodic reference signal, or the UE and base station can each determine that the aperiodic reference signal is to be transmitted based on detecting similar decoding parameters (e.g., based on the UE detection transmission of, and the base station detecting reception of, a number of NACKs received in feedback).

In any case, allowing or configuring a UE to transmit, for example, an A-SRS based on detecting certain decoding parameters can allow for more efficient reporting of CSI using less resources by not requiring the base station to trigger the A-SRS. This may also provide for improved communication quality of the UE with the network as poor channel conditions may be rectified earlier (e.g., without having to wait for a A-SRS trigger from the base station, which may also not be received depending on how degraded the channel conditions are). Though features are described herein in terms of SRSs, the features may be applied to substantially any type of reference signal to allow the UE to autonomously transmit the aperiodic reference signal based on the decoding parameter values.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting a SRS based on one or more conditions, in accordance with aspects described herein. In addition, some nodes may have a modem 340 and scheduling component 342 for scheduling a device with communication resources and/or configuring the device to autonomously transmit SRS, in accordance with aspects described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMEs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can be configured to autonomously transmit SRS based on detecting one or more conditions, which may relate to a decoding status or related parameters. For example, communicating component 242 can transmit the SRS based on detecting a number of NACK feedback transmitted by the UE 104, based on MCS, LLR, BER, SINR, or other metrics related to communications with a base station 102, and/or the like. Scheduling component 342 can determine when to receive a SRS from the UE 104 based on similar detection of the one or more conditions or based on receiving an indication of transmitting the SRS from the UE 104. Scheduling component 342 can use the SRS to determine CSI for modifying one or more communication parameters with the UE 104.

Figure 2:
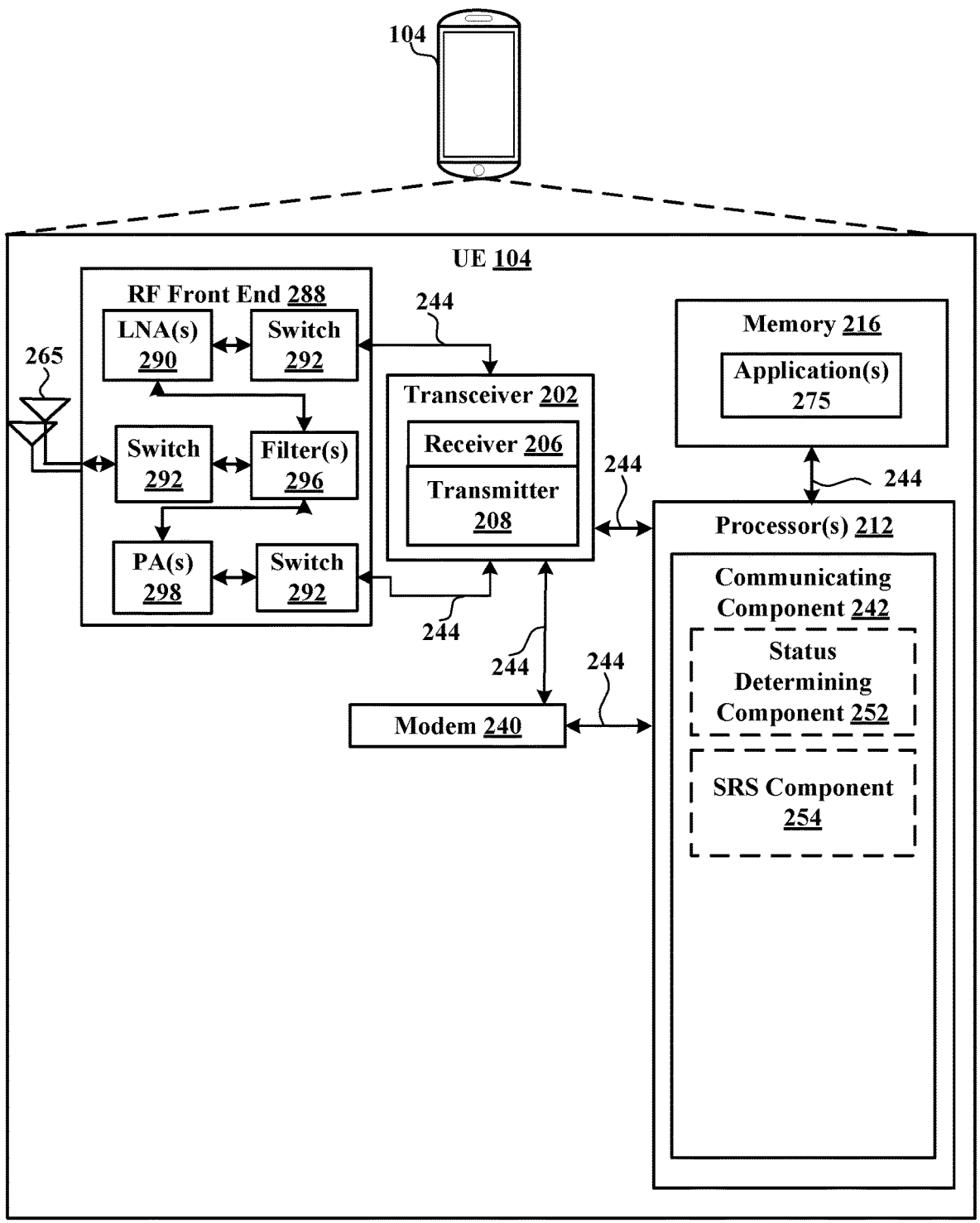
FIG. 2 is a block diagram illustrating an example of a UE, in accordance with various aspects of the present disclosure.
Figure 3:
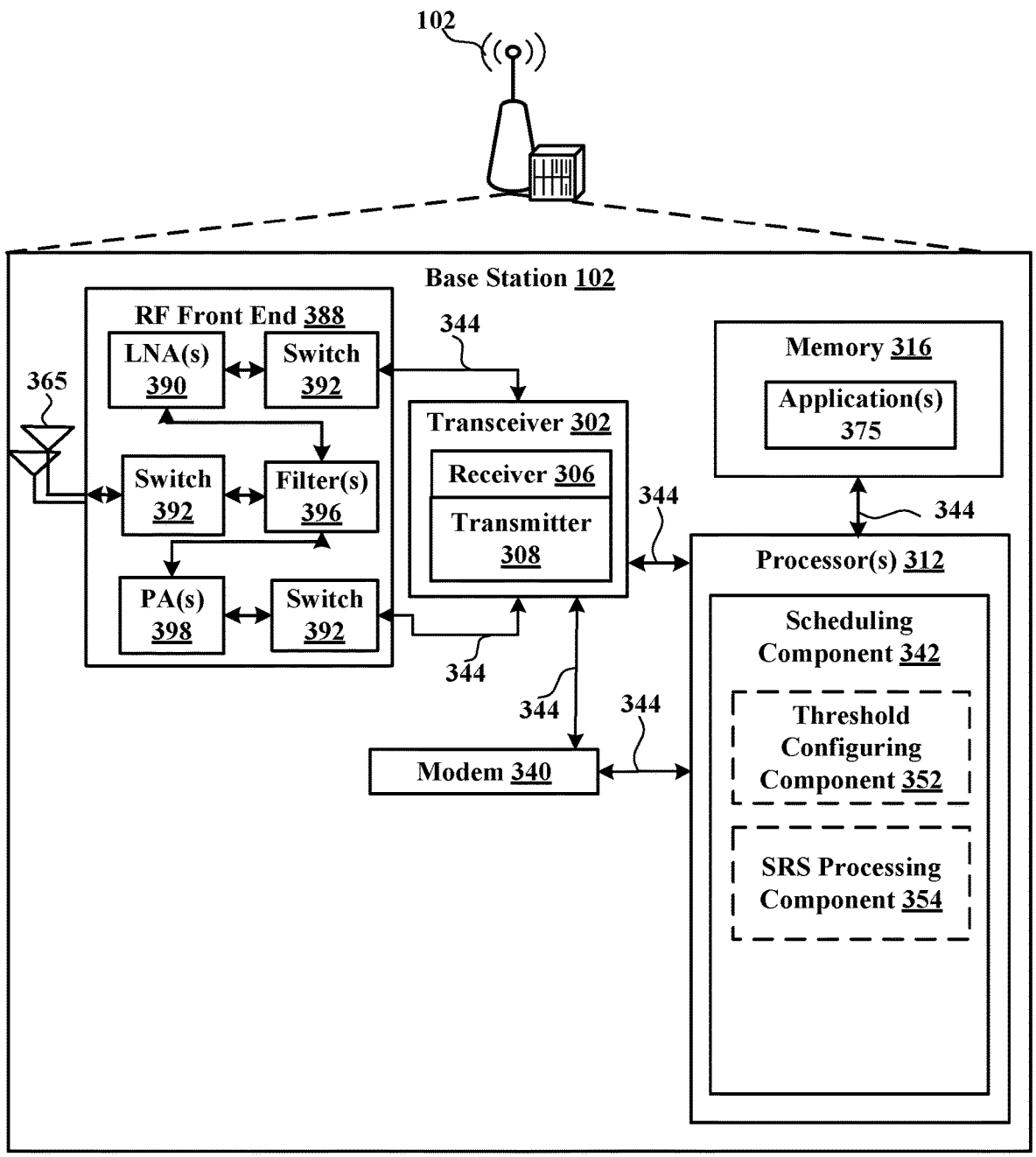
FIG. 3 is a block diagram illustrating an example of a base station, in accordance with various aspects of the present disclosure.
Figure 4:
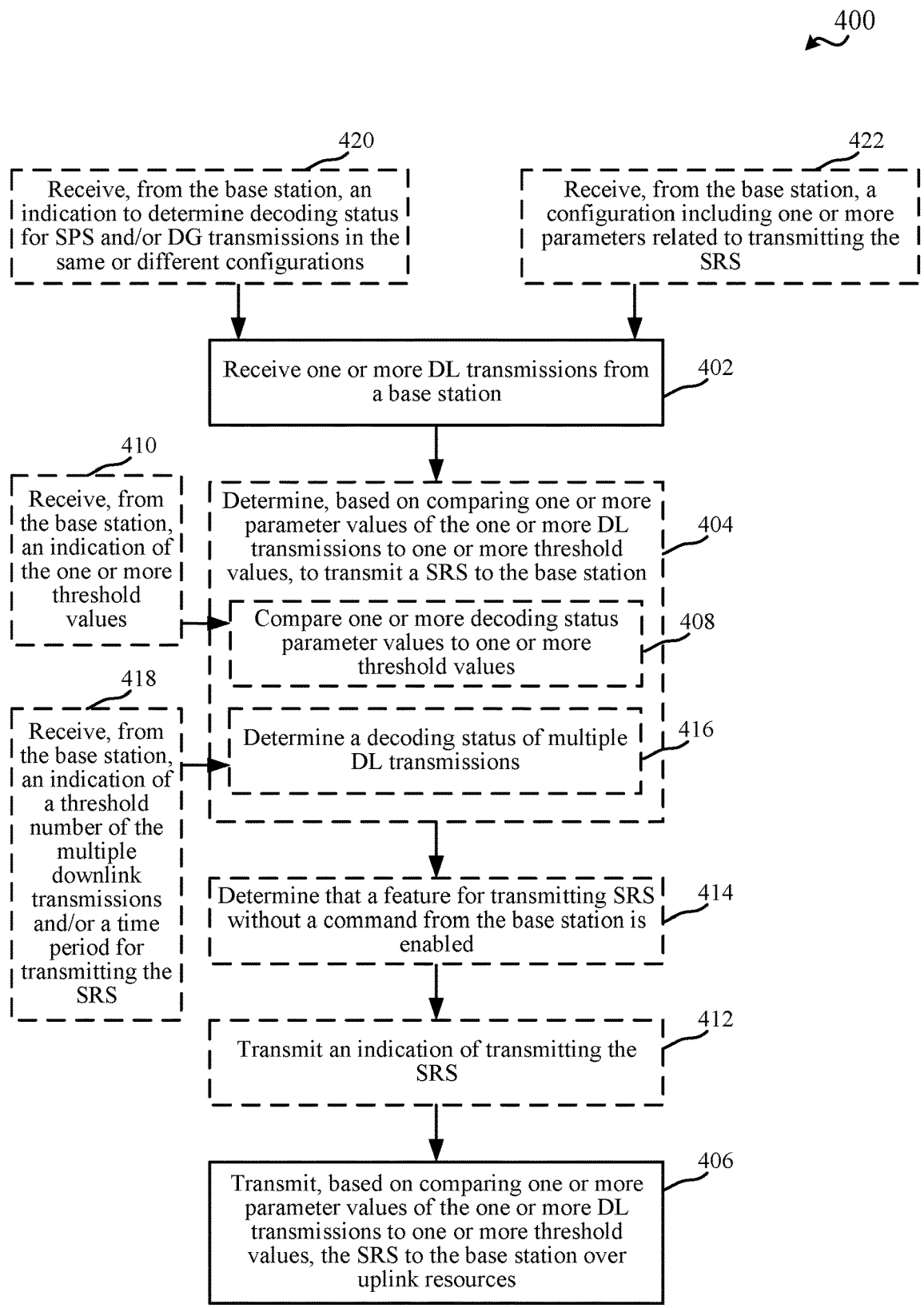
FIG. 4 is a flow chart illustrating an example of a method for transmitting a sounding reference signal (SRS), in accordance with various aspects of the present disclosure.
Figure 5:
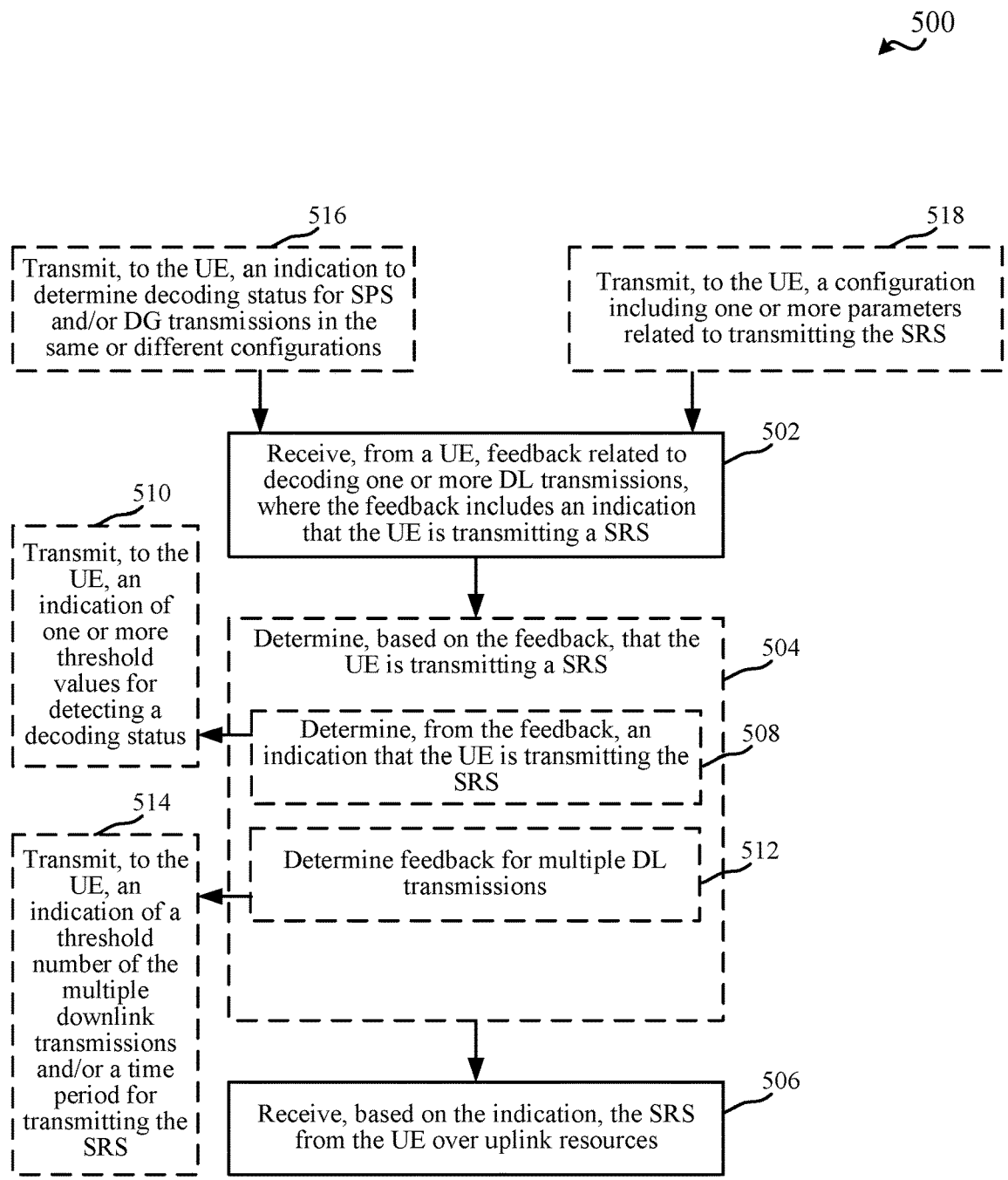
FIG. 5 is a flow chart illustrating an example of a method for configuring a device for transmitting a SRS, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting a SRS based on one or more conditions, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a status determining component 252 for determining a decoding status or other parameters related to communicating with a base station, and/or a SRS component 254 for determining to transmit a SRS based on the decoding status or other parameter values, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling a device with communication resources and/or configuring the device to autonomously transmit SRS, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a threshold configuring component 352 for configuring one or more threshold values related to a UE 104 detecting decoding conditions for transmitting a SRS, and/or an SRS processing component 354 for determining to receive (e.g., or when to receive) and/or process a SRS from a UE 104, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for transmitting a SRS based on one or more parameter values related to decoding status, in accordance with aspects described herein. In an example, a UE 104 can perform the functions described in method 400 using one or more of the components described in FIGS. 1 and 2.

In method 400, at Block 402, one or more DL transmissions can be received from a base station. In an aspect, communicating component 242, e.g., in conjunction with processor(s) 212, memory 216, transceiver 202, etc., can receive, from the base station (e.g., base station 102), one or more downlink transmissions. In one example, the base station 102 can configure the UE 104 to receive downlink transmissions based on one or more semi-persistent scheduling (SPS) configurations, where periodic resources for receiving the downlink transmissions can be specified and the UE 104 can determine the resources based on period information. In another example, the base station 102 can additionally or alternatively configure the UE 104 to receive downlink transmissions based on a dynamic grant (e.g., in downlink control information (DCI) received over a physical downlink control channel (PDCCH)), where the base station 102 can transmit a resource grant to the UE 104 for each downlink transmission indicating downlink resources over which to receive the downlink transmission. In either example, the resources may correspond to resources in frequency and/or in time over which the UE 104 can receive DL transmissions. In any case, communicating component 242 can receive the one or more DL transmissions over associated DL resources.

In method 400, optionally at Block 404, it can be determined, based on comparing one or more parameter values of the one or more DL transmissions to one or more threshold values, to transmit a SRS to the base station. In an aspect, status determining component 252, e.g., in conjunction with processor(s) 212, memory 216, transceiver 202, communicating component 242, etc., can determine, based on comparing one or more parameter values of the one or more DL transmissions to one or more threshold values, to transmit a SRS (or other reference signal) to the base station. For example, status determining component 252 can analyze one or more parameters or associated parameter values related to the decoding status of the one or more downlink transmissions. In an example, the one or more parameters can include an indication of feedback transmitted by the UE 104 for the one or more downlink transmissions, such as hybrid automatic repeat/request (HARQ) feedback, which may include an acknowledgement (ACK) or negative-ACK (NACK) feedback value, respectively indicating whether receiving and/or decoding of a downlink transmission is successful or not. In another example, the one or more parameters can relate to a modulation and coding scheme (MCS), bit error rate (BER), block-error rate (BLER), a number of negative acknowledged code blocks (CBs) or CB groups (CBGs), a ratio between unsuccessfully decoded transmissions (e.g., determined based on a number of negative acknowledged CBs or CBGs) to a total number of transmissions, one or more log-likelihood ratios (LLRs), etc. of the one or more downlink transmissions. In yet another example, the one or more parameters can relate to signal power or quality of the one or more downlink transmissions, such as observed signal-to-interference-and-noise ratio (SINR), signal-to-noise ratio (SNR), received signal strength indicator (RSSI), reference signal received power (RSRP), reference signal received quality (RSRQ), etc. In addition, using aspects described herein, status determining component 252 can determine to transmit other types of reference signals that allow the base station 102 to determine channel quality or parameters related to communications to determine whether to change communication parameters to improve UE performance.

In method 400, at Block 406, the SRS can be transmitted to the base station over uplink resources and based on comparing one or more parameter values of the one or more DL transmissions to one or more threshold values. In an aspect, SRS component 254, e.g., in conjunction with processor(s) 212, memory 216, transceiver 202, communicating component 242, etc., can transmit, based on comparing the one or more parameter values of the one or more DL transmissions to the one or more threshold values, the SRS to the base station over uplink resources. For example, SRS component 254 can transmit the SRS over uplink resources determined by the SRS component 254 or otherwise configured by the base station 102, as described further herein. For example, where the UE 104 and base station 102 both detect a decoding status, or otherwise determine, based on comparing the one or more parameter values of the one or more DL transmissions to the one or more threshold values that the UE 104 is to transmit a SRS, UE 104 and base station 102 can determine resources over which the UE 104 is to transmit the SRS. In another example, where the UE 104 can indicate transmission of the SRS, the base station 102 can configure the uplink resources for transmitting the SRS or can otherwise determine the uplink resources, similarly to the UE 104. As described, for example, the SRS can include or otherwise indicate or be indicative of one or more parameters related to CSI, which the base station 102 can use to modify one or more parameters for communicating with the UE 104 to improve quality or reliability thereof. Moreover, for example, transmitting the SRS can include transmitting the SRS over a same bandwidth part (BWP) over which the one or more downlink transmissions are received. For example, the SRS resource set for triggered A-SRS transmission can be per BWP per serving cell. In an example, the A-SRS is transmitted on the same BWP as the BWP on which the PDSCH is received. Separate open-loop power control parameters (e.g., alpha and/or P0) can be configured for the triggered A-SRS from other SRSs (e.g., regular antenna switching or codebook/non-codebook based PUSCH). SRS component 254 can accordingly use such power control parameters (or different parameters), in one example, for transmitting the SRS.

In determining to transmit the SRS at Block 404, optionally at Block 408, one or more decoding status parameter values can be compared to one or more threshold values. In an aspect, status determining component 252, e.g., in conjunction with processor(s) 212, memory 216, transceiver 202, communicating component 242, etc., can compare the one or more decoding status parameter values to the one or more threshold values. For example, status determining component 252 can compare a MCS, LLR, BER, BLER, SINR, SNR, RSSI, RSRP, RSQ, etc. to one or more threshold values to determine whether to transmit the SRS. For example, status determining component 252 can determine to transmit a SRS where a MCS is below a threshold, where a LLR, BER, or BLER, is above a threshold, where a SINR, SNR, RSSI, RSRP, or RSRQ is below (or above) a threshold, and/or the like. In addition, in an example, status determining component 252 can determine to transmit a SRS based on one or more of the foregoing parameter values and/or regardless of whether the PDSCH decoding results in ACK or NACK. In one example, UE 104 can measure a certain SINR, and map the SINR to a certain channel quality indicator (CQI) or corresponding MCS. The UE 104 can accordingly know the MCS used for the current transmission. If observed MCS is lower/higher than the current MCS by a certain level, in one example, status determining component 252 can determine to trigger SRS. Similarly, in an example, if SINR is below or above a certain threshold, relative to a nominal SINR (or a known SINR value or the SINR required for decoding), status determining component 252 can determine to trigger SRS. In another example, if many bits are in error, e.g., by computing a BER of the signal (e.g., where BER is greater than or equal to a threshold BER), status determining component 252 can determine to trigger SRS.

In method 400, optionally at Block 410, an indication of the one or more threshold values can be received from the base station. In an aspect, status determining component 252, e.g., in conjunction with processor(s) 212, memory 216, transceiver 202, communicating component 242, etc., can receive, from the base station (e.g., base station 102), the indication of the one or more threshold values. For example, status determining component 252 can receive the indication in a configuration in radio resource control (RRC) signaling from the base station 102, media access control-control element (MAC-CE) downlink control information (DCI), etc. from the base station 102, etc. In an example, status determining component 252 can accordingly use the one or more configured thresholds to compare with the one or more parameter values in transmitting, or determining whether to transmit, a SRS.

In method 400, optionally at Block 412, an indication of transmitting the SRS can be transmitted. In an aspect, SRS component 254, e.g., in conjunction with processor(s) 212, memory 216, transceiver 202, communicating component 242, etc., can transmit the indication of transmitting the SRS, which may be based on determining to transmit the SRS. As described in some examples above, status determining component 252 can autonomously transmit the SRS based on one or more parameters of decoding status, and the base station 102 may not be aware of the planned SRS transmission. Accordingly, in one example, status determining component 252 can transmit a separate indication that the UE 104 is transmitting the SRS in a subsequent time period. In one example, status determining component 252 can use ACK/NACK feedback bits (or fields) to indicate whether or not SRS is to be transmitted. In one example, given 2 bits for ACK/NACK feedback, status determining component 252 can use one of the bits (or a combination of bits) to indicate whether SRS is going to be transmitted. In one example, status determining component 252 can use a combination of two bits for HARQ feedback for one or more downlink transmissions as follows: 00 to indicate NACK feedback and no SRS transmission, 01 to indicate NACK feedback and SRS transmission, 10 to indicate ACK feedback and no SRS transmission, and 11 to indicate ACK feedback and SRS transmission. An example is shown in the table below:

| ACK/NACK Field | Request SRS Signal Field | Meaning |
| --- | --- | --- |
| 0 | 0 | NACK, and SRS not requested |
| 0 | 1 | NACK, and SRS requested |
| 1 | 0 | ACK, and SRS not requested |
| 1 | 1 | ACK, and SRS requested |

In the above examples, SRS component 254 can transmit the SRS in uplink resources where SRS transmission is indicated in the HARQ feedback. In an example, the UE 104 and base station 102 know the resources over which to transmit the SRS based on the indication, which can include the next uplink resources configured by the base station 102, the next uplink resources indicated for SRS transmission, etc.

In method 400, optionally at Block 414, it can be determined that a feature for transmitting SRS without a command from the base station is enabled. In an aspect, SRS component 254, e.g., in conjunction with processor(s) 212, memory 216, transceiver 202, communicating component 242, etc., can determine that the feature for transmitting SRS without a command from the base station is enabled. In this example, SRS component 254 can transmit the indication of the SRS (e.g., in HARQ feedback or otherwise) and/or transmit the SRS based on determining that the feature is enabled. In an example, SRS component 254 can determine that the feature is enabled based on indicating a capability to support the feature in UE capability information transmitted to the base station 102, based on an indication from the base station 102 that the feature is enabled (e.g., in RRC signaling, MAC-CE, DCI, etc.), and/or the like.

In another example, in determining to transmit the SRS at Block 404, optionally at Block 416, a decoding status of multiple downlink transmissions can be determined. In an aspect, status determining component 252, e.g., in conjunction with processor(s) 212, memory 216, transceiver 202, communicating component 242, etc., can determine the decoding status, or corresponding parameter values as described above, of the multiple DL transmissions. For example, status determining component 252 can count certain decoding status parameter values to determine whether to transmit the SRS. In one example, status determining component 252 can compare a number of NACKs transmitted to a threshold number of NACKs. In one example, this may include comparing a number of transmissions having at least a threshold number of NACKs to a threshold number of transmissions, where the threshold number of NACKs for a given transmission can be CB-based, CBG-based, etc. In an example, determining the decoding status of multiple DL transmissions may be used for SPS-scheduled DL transmissions.

In a specific example, given a number N of transmissions, each transmission can have a transport block, each transport block can have one or more CBGs, and each CBG can have one or more CBs. For example, status determining component 252 can determine, for each TB, a number of CBs (or CBGs) for which NACK is determined and/or reported in decoding the CBs (or CBGs). For each TB (or transmission), for example, status determining component 252 can determine a decoding status for each CB (or CBG) as successful or not successful (e.g., which may be a bit indicator). In this example, status determining component 252 can then determine whether a threshold number of transmissions (or TBs), X, out of Y total transmissions (or TBs) have an unsuccessful decoding status, and if so can determine to transmit SRS. In another example, status determining component 252 can additionally or alternatively determine at least one of a ratio of NACKed CBs (or CBGs) over a total number of CBs (or CBGs) per transmission (or TB), and can transmit SRS if the ratio is greater than a threshold. In another example, status determining component 252 can additionally or alternatively determine at least one of a ratio of NACKed CBGs over a total number of CBGs per transmission (or TB), and can transmit SRS if the ratio is greater than a threshold. In another example, status determining component 252 can similarly count other decoding status parameters related to multiple downlink transmissions as described above (e.g., MCS, LLR, BER, BLER, SINR, etc.) to determine a number of downlink transmissions X for which the decoding status parameters do or do not achieve one or more thresholds (e.g., out of Y total downlink transmissions or otherwise) in determining whether to transmit SRS.

In method 400, optionally at Block 418, an indication of a threshold number of the multiple downlink transmissions and/or a time period for transmitting the SRS can be received from the base station. In an aspect, status determining component 252, e.g., in conjunction with processor(s) 212, memory 216, transceiver 202, communicating component 242, etc., can receive, from the base station, an indication of the threshold number of the multiple downlink transmissions and/or the time period for transmitting the SRS. For example, status determining component 252 can receive, from the base station (e.g., base station 102), in RRC signaling, MAC-CE, DCI, etc., an indication of X and/or Y, as described above, and/or an indication of the time period T, after which the UE 104 can transmit the SRS. For example, the time period T may indicate a number of symbols or slots after a last symbol or slot over which the multiple downlink transmissions are received. In this example, the UE 104 can determine when to transmit the SRS based on detecting certain decoding status for X of Y downlink transmissions, and/or can transmit the SRS after time period T from receiving a last one of the Y (or X) downlink transmissions or from transmitting the feedback for the last one of the Y (or X) downlink transmissions. In an example, where the UE 104 also transmits the decoding status (e.g., as HARQ feedback), the base station 102 can similarly determine when the UE 104 is to transmit the SRS based on detecting decoding status (e.g., NACK) X times for Y downlink transmissions, and can determine when to expect the SRS based on T, as described further herein.

In one example related to CBs and/or CBGs, determining to transmit an SRS or determining a decoding status for a transmission (e.g., such to determine whether a threshold number of transmissions have unsuccessful decoding status as described above) can be based on BLER or fraction of error CBs over total CBs or fraction of CBGs in error over total number of CBGs, etc. For example, where status determining component 252 determines the number of unsuccessfully decoded transmissions is high, which may be based on a number of CBs or CBGs within the transmission that are NACKed, then status determining component 252 can determine an issue with the received signal and to transmit SRS. In this example, the threshold may be received in a configuration from the base station 102.

In method 400, optionally at Block 420, an indication to determine decoding status for SPS and/or dynamic grant (DG) transmissions can be received in the same or different configurations. In an aspect, status determining component 252, e.g., in conjunction with processor(s) 212, memory 216, transceiver 202, communicating component 242, etc., can receive, from the base station (e.g., base station 102), the indication to determine decoding status for SPS and/or DG transmissions in the same or different configurations. As described, the UE 104 can be configured to receive downlink transmissions in one or more SPS configurations and/or based on one or more DGs. The base station 102 can specify, via the indication, whether the UE 104 is to consider the decoding status of one SPS configuration, multiple SPS configurations, and/or one or more DGs in determining whether to transmit the SRS. In one example, status determining component 252 can receive the indication to consider only one SPS configuration, and thus status determining component 252 can determine whether to transmit the SRS based on considering decoding status of DL transmissions received over the resources of the one SPS configuration, as described above (and/or of multiple SPS configurations, but considered separately). In another example, status determining component 252 can receive the indication to consider multiple (or all) SPS configurations, and thus status determining component 252 can consider decoding status of multiple SPS configurations in determining whether to transmit SRS. For example, status determining component 252 can combine the one or more parameter values from DL transmissions received over resources of multiple SPS configurations to determine whether to transmit SRS (e.g., status determining component 252 can add NACKs from various SPS configurations to determine if X NACKs have occurred, etc.). In an example, status determining component 252 can total, average, take minimum or maximum values, etc. of the parameter values for the downlink transmissions received over the multiple SPS configurations in determining whether to transmit SRS. In addition, in an example, status determining component 252 can receive the indication to determine decoding status for SPS and/or DG transmissions in RRC signaling, MAC-CE, DCI, etc.

In method 400, optionally at Block 422, a configuration including one or more parameters related to transmitting the SRS can be received from the base station. In an aspect, SRS component 254, e.g., in conjunction with processor(s) 212, memory 216, transceiver 202, communicating component 242, etc., can receive, from the base station, the configuration including the one or more parameters related to transmitting the SRS. In an example, SRS component 254 can transmit the SRS based on the one or more parameters indicated in the configuration. The configuration can be the same or different from other configurations received by the UE 104, as described above. For example, SRS component 254 can receive the configuration in RRC, MAC-CE, DCI, etc. signaling from the base station. The configuration may indicate the uplink resources over which the UE 104 is to transmit the SRS (e.g., frequency and/or time resources), parameters for determining the uplink resources (e.g., K1 or other measurement of offset from a time from which the UE 104 decodes the one or more DL transmissions to the time when the UE 104 is to transmit the SRS), etc.

In addition, for example, the configuration may indicate one or more repetitions of the SRS to be transmitted, resources over which the repetitions of the SRS are to be transmitted, conditions for determining whether to transmit one or more repetitions of the SRS, etc. In this example, SRS component 254 can determine to transmit one or more repetitions of the SRS to the base station 102 over associated resources and/or based on detecting one or more conditions. For example, for a decoding status quality (and/or feedback) of the one or more DL transmissions, SRS component 254 can determine to transmit a certain number of SRS repetitions. In an example, the SRS configuration can be a function of decoding status quality, feedback value (e.g., ACK/NACK), etc. In another example, the configuration may indicate density of the uplink resources, comb level, etc. In any case, SRS component 254 can transmit one or more SRSs based on the configuration and based on the decoding result of the one or more DL transmissions.

In the above examples, this can work under SPS PDSCH with one or more SPS configurations. Whether to transmit the SRS may be determined 1) per SPS configuration (where only the SPS PDSCH occasions from a specific SPS configuration are involved in the counting of X "bad received signals" out of Y transmissions); or 2) when the conditions are happening across SPS configurations (where the SPS PDSCH occasions from multiple SPS configurations are involved in the counting of X "bad received signals" out of Y transmissions). The concepts can be similarly and/or additionally applied to DGs, across multiple DGs, across DGs and SPS configurations, etc.

FIG. 5 illustrates a flow chart of an example of a method 500 for configuring a device to transmit a SRS based on detecting decoding status of downlink transmissions, in accordance with aspects described herein. In an example, a base station 102 can perform the functions described in method 500 using one or more of the components described in FIGS. 1 and 3.

In method 500, at Block 502, feedback related to decoding one or more DL transmissions can be received, where the feedback includes an indication that the UE is transmitting a SRS. In an aspect, scheduling component 342, e.g., in conjunction with processor(s) 312, memory 316, transceiver 302, etc., can receive, from the UE (e.g., UE 104), feedback related to decoding one or more downlink transmissions, where the feedback includes an indication that the UE is transmitting a SRS. In an example, the downlink transmissions can be transmitted by the base station 102 to the UE 104 based on one or more SPS configurations, DGs, etc., as described. In addition, the feedback can include HARQ feedback (e.g., ACK/NACK) for the downlink transmissions, or other parameters related to decoding status, as described above. In an example, scheduling component 342 can receive the feedback in uplink resources scheduled for the UE 104. As described above and further herein, the feedback may include an explicit indicator that the UE 104 is transmitting a SRS or may include values that implicitly indicate that the UE 104 is transmitting a SRS.

In method 500, optionally at Block 504, it can be determined, based on the feedback, that the UE is transmitting a SRS. In an aspect, SRS processing component 354, e.g., in conjunction with processor(s) 312, memory 316, transceiver 302, scheduling component 342, etc., can determine, based on the feedback, that the UE is transmitting the SRS. In one example, the feedback can include the indication that the UE is transmitting the SRS or may include other parameters from which a decoding status can be determined and/or a decoding status for multiple downlink transmissions that results in transmitting the SRS.

In method 500, at Block 506, the SRS can be received from the UE over uplink resources and based on the indication. In an aspect, SRS processing component 354, e.g., in conjunction with processor(s) 312, memory 316, transceiver 302, scheduling component 342, etc., can receive, based on the indication, the SRS from the UE over uplink resources. In an example, SRS processing component 354 can determine, from the SRS, a report CSI or other channel state or quality metrics. SRS processing component 354 can determine to adjust one or more communication parameters with the UE 104 based on the channel state or quality metrics (e.g., to allocate additional resources to the UE 104, change a MCS, handover the UE, etc.). In addition, in an example, SRS processing component 354 can receive the SRS over a same BWP used to transmit the one or more downlink transmissions. In another example, SRS processing component 354 can receive and/or process the SRS based on similar parameters configured for receiving and/or processing an A-SRS or periodic SRS triggered by the base station 102.

In determining that the UE is transmitting the SRS at Block 504, optionally at Block 508, an indication that the UE is transmitting the SRS can be determined from the feedback. In an aspect, SRS processing component 354, e.g., in conjunction with processor(s) 312, memory 316, transceiver 302, scheduling component 342, etc., can determine, from the feedback, that the UE is transmitting the SRS. As described, in an example, the feedback provided by the UE can indicate that an SRS is to be transmitted (e.g., by using one bit or a combination of bits in a 2-bit HARQ feedback or other explicit or implicit indicator). SRS processing component 354 can determine the uplink resources for the SRS based on receiving the indication and/or when the indication is received (e.g., as a next uplink slot or symbol), etc.

In method 500, optionally at Block 510, an indication of one or more threshold values for detecting a decoding status can be transmitted to the UE. In an aspect, threshold configuring component 352, e.g., in conjunction with processor(s) 312, memory 316, transceiver 302, scheduling component 342, etc., can transmit, to the UE (e.g., UE 104), the indication of one or more threshold values for detecting the decoding status or otherwise comparing to one or more parameter values of DL transmissions to determine whether to transmit SRS. For example, threshold configuring component 352 can transmit, to the UE, the indication of a threshold MCS, LLR, BER, BLER, SINR, SNR, RSSI, RSRP, RSRQ, etc., as described, to indicate the UE 104 is to transmit SRS. Threshold configuring component 352 can transmit an indication of the threshold value(s) in RRC signaling, MAC-CE, DCI, etc. to the UE 104. Thus, where the UE 104 determines to transmit the SRS based on the threshold value(s), the UE 104 can indicate transmission of the SRS in the feedback, as described.

In another example, in determining that the UE is transmitting the SRS at Block 504, optionally at Block 512, feedback for multiple downlink transmissions can be determined. In an aspect, SRS processing component 354, e.g., in conjunction with processor(s) 312, memory 316, transceiver 302, scheduling component 342, etc., can determine the feedback for the multiple downlink transmissions. In one example, this can include determining an implicit indication that the UE is transmitting the SRS based on the feedback for multiple DL transmissions. For example, SRS processing component 354 can determine that a number of the multiple downlink transmissions have feedback that may lead to an indication that a SRS is to be transmitted (e.g., NACK feedback). As described above, for example, SRS processing component 354 can determine XNACKs are received for X CBs, XNACKs are received for X CBs out of a total of Y CBs, similar determinations for CBGs, etc., as described above, and if so can determine that the UE 104 is to transmit SRS. Thus, SRS processing component 354, in this example, can expect the UE 104 to transmit the SRS (e.g., at a next uplink slot or symbol or otherwise based on a time period T, as described above and further herein).

In method 500, optionally at Block 514, an indication of a threshold number of the multiple downlink transmissions and/or a time period for transmitting the SRS can be transmitted to the UE. In an aspect, threshold configuring component 352, e.g., in conjunction with processor(s) 312, memory 316, transceiver 302, scheduling component 342, etc., can transmit, to the UE (e.g., UE 104), the indication of the threshold number of the multiple downlink transmissions and/or the time period for transmitting the SRS. For example, threshold configuring component 352 can transmit an indication of X, Y, and/or T, as described above, in RRC signaling, MAC-CE, DCI, etc. to the UE 104. Similarly, for example, SRS processing component 354 can determine to receive and process the SRS from the UE 104 based on the configured X, Y, and/or T (e.g., based on detecting XNACKs for Y downlink transmissions or otherwise, and determining uplink resources after time period T from the last downlink transmission, the last X downlink transmission, or the feedback for the last Y or X downlink transmission).

In method 500, optionally at Block 516, an indication to determine decoding status for SPS and/or DG transmissions in the same or different configurations can be transmitted to the UE. In an aspect, SRS processing component 354, e.g., in conjunction with processor(s) 312, memory 316, transceiver 302, scheduling component 342, etc., can transmit, to the UE (e.g., UE 104), the indication to determine decoding status for SPS and/or DG transmissions in the same or different configurations. As described, for example, the base station 102 can configure the UE 104 with one or more SPS configurations and/or DGs for receiving the downlink transmissions. SRS processing component 354 can specify, via the indication, whether the UE 104 is to consider the decoding status of one SPS configuration, multiple SPS configurations, and/or one or more DGs in determining whether to transmit the SRS (e.g., whether the UE 104 is to total, average, determine maximum or minimum values, etc. for parameter values from one SPS configuration, multiple SPS configurations, and/or one or more DGs, etc.). In one example, the indication can relate to considering only one SPS configuration, multiple (or all) SPS configurations, DGs, etc. In an example, SRS processing component 354 can transmit the indication in RRC signaling, MAC-CE, DCI, etc.

In method 500, optionally at Block 518, a configuration including one or more parameters related to transmitting the SRS can be transmitted to the UE. In an aspect, SRS processing component 354, e.g., in conjunction with processor(s) 312, memory 316, transceiver 302, scheduling component 342, etc., can transmit, to the UE, the configuration including the one or more parameters related to transmitting the SRS. In an example, the configuration can be the same or different from other configurations transmitted by the base station 102, as described above. For example, SRS processing component 354 can transmit the configuration in RRC, MAC-CE, DCI, etc. signaling. The configuration may indicate the uplink resources over which the UE 104 is to transmit the SRS (e.g., frequency and/or time resources), parameters for determining the uplink resources (e.g., K1 or other measurement of offset from a time from which the UE decodes the one or more DL transmissions to the time when the UE is to transmit the SRS), etc. In addition, for example, the configuration may indicate one or more repetitions of the SRS to be transmitted, resources over which the repetitions of the SRS are to be transmitted, conditions for determining whether to transmit one or more repetitions of the SRS, etc. In another example, the configuration may indicate density of the uplink resources, comb level, etc.

Figure 6:
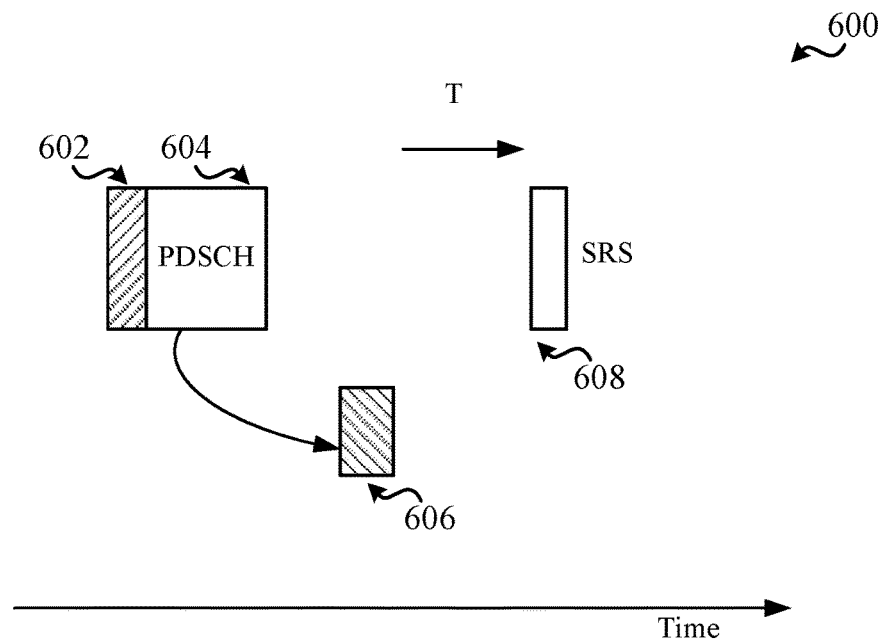
FIG. 6 illustrates examples of timelines for transmitting SRSs, in accordance with various aspects of the present disclosure.
Figure 6:
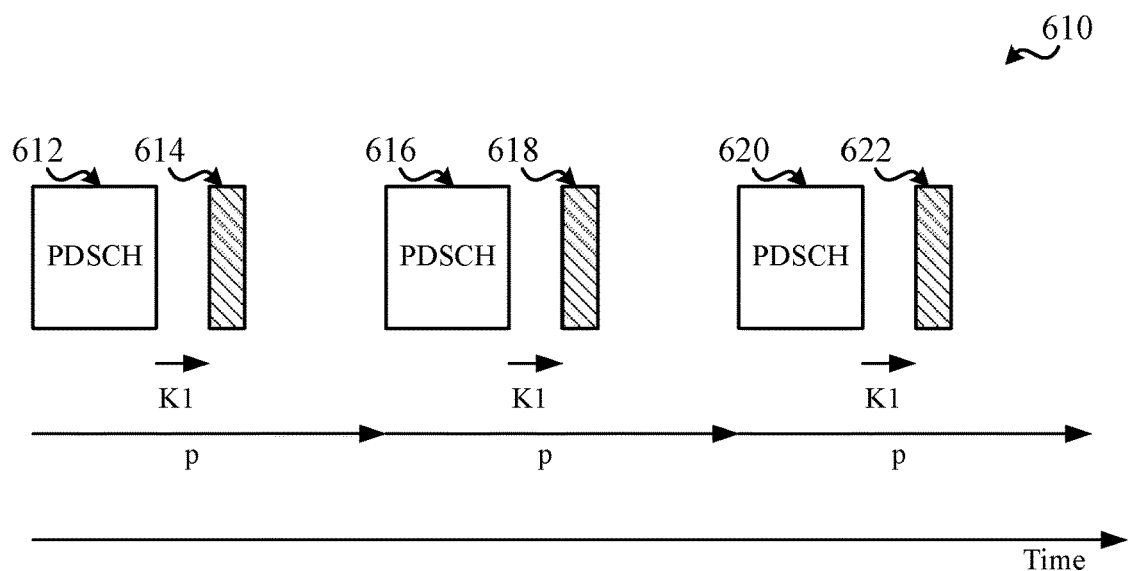

FIG. 6 illustrates an example of a timeline 600 for transmitting SRS based on a decoding status of PDSCH. In timeline 600, the UE 104 can receive downlink control information 602 and PDSCH 604. As described, for example, resources for the downlink control information 602 and/or PDSCH 604 can be indicated in one or more SPS configurations or DGs. In one example, downlink control information 602 can schedule PDSCH 604. The UE 104 can transmit feedback 606 for PDSCH 604. Where the feedback triggers autonomous SRS reporting by the UE 104, as described above, the UE 104 can transmit SRS 608. In one example, the feedback 606 can include an indication of transmitting the SRS 608. In another example, the UE 104 can transmit the SRS 608 after time T, which can be measured from receiving the last PDSCH 604 or transmitting the feedback 606. In one example, as described above, the base station can configure the value for time T, or the value may be otherwise known or configured at the UE.

FIG. 6 also illustrates an example of a timeline 610 for transmitting SRS based on a decoding status of PDSCH in SPS communications. In timeline 620, the UE 104 can receive PDSCH 612, 616, 620 according to a configured periodicity, p, and for each PDSCH can transmit corresponding feedback 614, 618, 622 (e.g., in PUCCH) after a period of K1. For example, K1 may be defined as a number of symbols from the end of the previous PDSCH at which to transmit the feedback. In some examples, such as where X negative feedbacks are determined for a last Y PDSCHs, at least one feedback may include an indication of transmitting SRS. In an example, this may be one of feedback 614, 618, 622, or may be a different feedback transmission. In another example, the indication of transmitting SRS may be transmitted in another indication that is at least a time period T from the last PDSCH of the group of XPDSCHs, etc., as described above.

Figure 7:
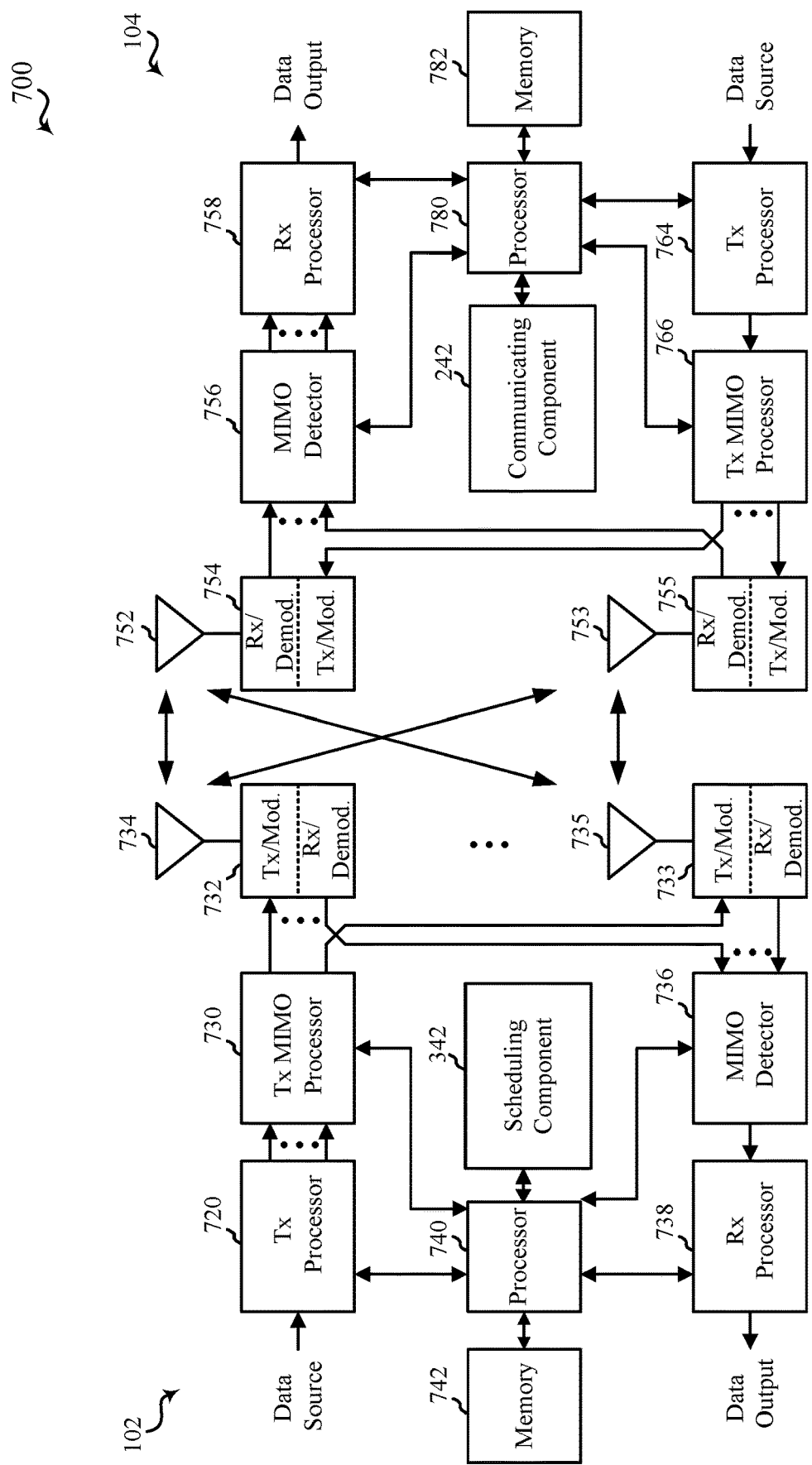
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a scheduling component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including receiving one or more downlink transmissions from a base station, determining, based on a decoding status related to the one or more downlink transmissions, to transmit a SRS to the base station, and transmitting, based on determining to transmit the SRS, the SRS to the base station over uplink resources.

In Aspect 2, the method of Aspect 1 includes where determining to transmit the SRS includes comparing at least one of an observed MCS, LLR, observed SINR, BER, BLER, a number of negative acknowledged CBs, a ratio between the negative acknowledged CBs over the total number of CBs, a number of negative acknowledged CBGs, a ratio between the negative acknowledged CBGs over the total number of CBGs, one or more LLRs, of the one or more downlink transmissions to one or more threshold values.

In Aspect 3, the method of Aspect 2 includes receiving, from the base station, a configuration indicating the one or more threshold values for determining to transmit the SRS.

In Aspect 4, the method of any of Aspects 2 or 3 includes transmitting, to the base station, based on determining to transmit the SRS, and prior to transmitting the SRS, an indication of transmitting the SRS.

In Aspect 5, the method of Aspect 4 includes where transmitting the indication includes transmitting the indication to the base station along with HARQ feedback.

In Aspect 6, the method of any of Aspects 4 or 5 includes where transmitting the indication is further based on determining that a feature for transmitting SRS without a command from the base station is enabled.

In Aspect 7, the method of any of Aspects 1 to 6 includes where the one or more downlink transmissions include multiple downlink transmissions, and where determining to transmit the SRS is based on the decoding status related to at least a portion of the multiple downlink transmissions.

In Aspect 8, the method of Aspect 7 includes where determining to transmit the SRS is based on the decoding status for at least a threshold number of the multiple downlink transmissions.

In Aspect 9, the method of Aspect 8 includes receiving, from the base station, a configuration indicating at least one of the threshold number of the multiple downlink transmissions or a number representing the multiple downlink transmissions.

In Aspect 10, the method of Aspect 9 includes where the configuration further indicates a time period after which to transmit the SRS to the base station, and where transmitting the SRS to the base station is performed in uplink resources occurring after the time period from receiving the multiple downlink transmissions.

In Aspect 11, the method of any of Aspects 7 to 10 includes where determining the decoding status includes determining that the decoding of at least the portion of the multiple downlink transmissions results in NACK feedback.

In Aspect 12, the method of any of Aspects 1 to 11 includes where transmitting the SRS includes transmitting the SRS on a same BWP of the one or more downlink transmissions.

In Aspect 13, the method of any of Aspects 1 to 12 includes where transmitting the SRS is based on a first configuration that is different from a second configuration received from the base station that configures transmission of aperiodic SRS.

In Aspect 14, the method of any of Aspects 1 to 13 includes where the one or more downlink transmissions are received in resources of one or more dynamic grants or a same SPS configuration.

In Aspect 15, the method of any of Aspects 1 to 14 includes where the one or more downlink transmissions include at least a first downlink transmission received in first resources of a first SPS configuration and at least a second downlink transmission received in second resources of a second SPS configuration.

In Aspect 16, the method of Aspect 15 includes where the one or more downlink transmissions further include at least a third downlink transmission received in third resources of a dynamic grant.

In Aspect 17, the method of any of Aspects 1 to 16 includes receiving, from a base station, an indication to determine the decoding status of either downlink transmissions received in resources of a same SPS configuration or downlink transmissions received in resources of multiple SPS configurations.

Aspect 18 is a method for wireless communication including receiving, from a UE, feedback related to decoding one or more downlink transmissions, determining, based on the feedback, that the UE is transmitting a SRS, and receiving, based on determining that the UE is transmitting the SRS, the SRS from the UE over uplink resources.

In Aspect 19, the method of Aspect 18 includes transmitting, to the UE, a configuration indicating one or more threshold values for determining to transmit the SRS.

In Aspect 20, the method of any of Aspects 18 or 19 includes where the feedback includes an indication that the UE is transmitting the SRS, and where receiving the SRS is based on the indication.

In Aspect 21, the method of any of Aspects 18 to 20 includes where the one or more downlink transmissions include multiple downlink transmissions, and where determining that the UE is transmitting the SRS is based on the feedback received for at least a portion of the multiple downlink transmissions.

In Aspect 22, the method of Aspect 21 includes where determining that the UE is transmitting the SRS is based on the feedback for at least a threshold number of the multiple downlink transmissions.

In Aspect 23, the method of Aspect 22 includes transmitting, to the UE, a configuration indicating at least one of the threshold number of the multiple downlink transmissions or a number representing the multiple downlink transmissions.

In Aspect 24, the method of Aspect 23 includes where the configuration further indicates a time period after which to transmit the SRS to the base station, and where receiving the SRS includes determining the uplink resources for receiving the SRS occurring after the time period from receiving the multiple downlink transmissions.

In Aspect 25, the method of any of Aspects 21 to 24 includes where determining that the UE is transmitting the SRS is based on determining that the feedback for at least the portion of the multiple downlink transmissions results in NACK feedback.

In Aspect 26, the method of any of Aspects 18 to 25 includes where receiving the SRS includes receiving the SRS on a same BWP of the one or more downlink transmissions.

In Aspect 27, the method of any of Aspects 18 to 26 includes transmitting, to the UE, a first configuration for determining to transmit the SRS based on decoding status that is different from a second configuration transmitted to the UE that configures transmission of aperiodic SRS.

In Aspect 28, the method of any of Aspects 18 to 27 includes transmitting, to the UE, an indication to determine to transmit the SRS based on decoding status of either downlink transmissions received in resources of a same SPS configuration or downlink transmissions received in resources of multiple SPS configurations, where receiving the SRS is based at least in part on the indication.

Aspect 29 is a method for wireless communication including receiving one or more downlink transmissions from a base station, and transmitting, based on comparing one or more parameter values of the one or more downlink transmissions to one or more threshold values, a SRS to the base station over uplink resources.

In Aspect 30, the method of Aspect 29 includes where comparing the one or more parameter values includes comparing at least one of an observed MCS, one or more LLRs, an observed SINR, a BER, a BLER, a number of negative acknowledged CBs, a ratio between the negative acknowledged CBs over the total number of CBs, a number of negative acknowledged CBGs, or a ratio between the negative acknowledged CBGs over the total number of CBGs, of the one or more downlink transmissions to the one or more threshold values.

In Aspect 31, the method of any of Aspects 29 or 30 includes receiving, from the base station, a configuration indicating the one or more threshold values.

In Aspect 32, the method of any of Aspects 29 to 31 includes transmitting, to the base station, based on determining to transmit the SRS, and prior to transmitting the SRS, an indication of transmitting the SRS.

In Aspect 33, the method of Aspect 32 includes where transmitting the indication includes transmitting the indication to the base station along with HARQ feedback.

In Aspect 34, the method of any of Aspects 32 or 33 includes where transmitting the indication is further based on determining that a feature for transmitting SRS without a command from the base station is enabled.

In Aspect 35, the method of any of Aspects 29 to 34 includes where the one or more downlink transmissions include multiple downlink transmissions, and where transmitting the SRS is based on comparing the one or more parameter values of the multiple downlink transmissions to the one or more threshold values.

In Aspect 36, the method of Aspect 35 includes where transmitting the SRS is based on the one or more parameter values of at least a threshold number of the multiple downlink transmissions being at least at the one or more threshold values.

In Aspect 37, the method of Aspect 36 includes receiving, from the base station, a configuration indicating at least one of the threshold number of the multiple downlink transmissions or a number representing the multiple downlink transmissions.

In Aspect 38, the method of Aspect 37 includes where the configuration further indicates a time period after which to transmit the SRS to the base station, and where transmitting the SRS to the base station is performed over the uplink resources occurring after the time period from receiving the multiple downlink transmissions.

In Aspect 39, the method of any of Aspects 35 to 38 includes where the one or more parameter values of the one or more downlink transmissions includes a decoding status resulting in a NACK feedback value.

In Aspect 40, the method of any of Aspects 29 to 39 includes where transmitting the SRS includes transmitting the SRS on a same BWP of the one or more downlink transmissions.

In Aspect 41, the method of any of Aspects 29 to 40 includes where transmitting the SRS is based on a first configuration that is different from a second configuration received from the base station that configures transmission of aperiodic SRS.

In Aspect 42, the method of any of Aspects 29 to 41 includes where the one or more downlink transmissions are received in resources of one or more dynamic grants or a same SPS configuration.

In Aspect 43, the method of any of Aspects 29 to 42 includes where the one or more downlink transmissions include at least a first downlink transmission received in first resources of a first SPS configuration and at least a second downlink transmission received in second resources of a second SPS configuration.

In Aspect 44, the method of Aspect 45 includes where the one or more downlink transmissions further include at least a third downlink transmission received in third resources of a dynamic grant.

In Aspect 45, the method of any of Aspects 29 to 44 includes receiving, from a base station, an indication to compare, to the one or more threshold values, the one or more parameter values of either downlink transmissions received in resources of a same SPS configuration or downlink transmissions received in resources of multiple SPS configurations.

In Aspect 46, the method of any of Aspects 29 to 45 includes receiving, from the base station a configuration including one or more parameters related to transmitting the SRS, where the one or more parameters include at least one of a resource density or a comb level for transmitting the SRS.

In Aspect 47, the method of any of Aspects 29 to 46 includes receiving, from the base station a configuration including one or more parameters related to a number of repetitions of the SRS to transmit, where transmitting the SRS includes transmitting the number of repetitions of the SRS over a period of time based on the one or more parameters.

Aspect 48 is a method for wireless communication including receiving, from a UE, feedback related to decoding one or more downlink transmissions, where the feedback includes an indication that the UE is transmitting a SRS, and receiving, based on the indication, the SRS from the UE over uplink resources.

In Aspect 49, the method of Aspect 48 includes transmitting, to the UE, a configuration indicating one or more threshold values for determining to transmit the SRS.

In Aspect 50, the method of any of Aspects 48 or 49 includes where the one or more downlink transmissions include multiple downlink transmissions, and where the feedback for the multiple downlink transmissions indicates that the UE is transmitting the SRS for at least a portion of the multiple downlink transmissions.

In Aspect 51, the method of Aspect 50 includes transmitting, to the UE, a configuration indicating at least one of the threshold number of the multiple downlink transmissions or a number representing the multiple downlink transmissions.

In Aspect 52, the method of Aspect 51 includes where the configuration further indicates a time period after which to transmit the SRS to the base station, and where receiving the SRS is based on determining the uplink resources for receiving the SRS occurring after the time period from receiving the multiple downlink transmissions.

In Aspect 53, the method of any of Aspects 51 or 52 includes where the indication includes a NACK feedback value received for at least the portion of the multiple downlink transmissions.

In Aspect 54, the method of any of Aspects 48 to 53 includes where receiving the SRS includes receiving the SRS on a same BWP of the one or more downlink transmissions.

In Aspect 55, the method of any of Aspects 48 to 54 includes transmitting, to the UE, a first configuration for determining to transmit the SRS based on decoding status that is different from a second configuration transmitted to the UE that configures transmission of aperiodic SRS.

In Aspect 56, the method of any of Aspects 48 to 55 includes transmitting, to the UE, an indication to determine to transmit the SRS based on comparing, to one or more threshold values, one or more parameter values of either downlink transmissions received in resources of a SPS configuration or downlink transmissions received in resources of multiple SPS configurations, where receiving the SRS is based at least in part on the indication.

In Aspect 57, the method of any of Aspects 48 to 56 includes transmitting, to the UE, a configuration including one or more parameters related to transmitting the SRS, where the one or more parameters include at least one of a resource density, a comb level for transmitting the SRS, or parameters related to transmitting the number of repetitions of the SRS over a period of time based on the one or more parameters.

Aspect 58 is an apparatus for wireless communication including a transceiver, a memory configured to store instructions, and one or more processors communicatively coupled with the memory and the transceiver, where the one or more processors are configured to perform one or more of the methods of any of Aspects 1 to 57.

Aspect 59 is an apparatus for wireless communication including means for performing one or more of the methods of any of Aspects 1 to 57.

Aspect 60 is a computer-readable medium including code executable by one or more processors for wireless communications, the code including code for performing one or more of the methods of any of Aspects 1 to 57.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
memory configured to store instructions; and
one or more processors communicatively coupled with the memory and the transceiver, wherein the one or more processors are configured to cause the apparatus to:
receive one or more downlink data transmissions from a base station; and
transmit, based on comparing one or more parameter values resulting from decoding the one or more downlink data transmissions to one or more threshold values, an indication of transmitting a sounding reference signal (SRS) to the base station, wherein the one or more parameter values comprises a decoding status of the one or more downlink data transmissions and the decoding status resulting in a negative-acknowledgement (NACK) feedback value; and
transmit, based on the comparing, the SRS to the base station over uplink resources.

2. The apparatus of claim 1, wherein comparing the one or more parameter values further includes comparing at least one of an observed modulation and coding scheme (MCS), one or more log likelihood ratios (LLRs), an observed signal-to-interference-and-noise ratio (SINR), a bit error rate (BER), a block-error rate (BLER), of the one or more downlink data transmissions to the one or more threshold values.

3. The apparatus of claim 1, wherein the one or more processors are further configured to cause the apparatus to receive, from the base station, a configuration indicating the one or more threshold values.

4. The apparatus of claim 1, wherein the one or more processors are configured to cause the apparatus to transmit the indication to the base station along with hybrid automatic repeat/request (HARQ) feedback.

5. The apparatus of claim 1, wherein the one or more processors are configured to cause the apparatus to transmit the indication further based on determining that a feature for transmitting SRS without a command from the base station is enabled.

6. The apparatus of claim 1, wherein the one or more downlink data transmissions include multiple downlink data transmissions, and wherein the one or more processors are configured to cause the apparatus to transmit the SRS based on comparing the one or more parameter values of the multiple downlink data transmissions to the one or more threshold values.

7. The apparatus of claim 6, wherein the one or more processors are configured to cause the apparatus to transmit the SRS based on the one or more parameter values of at least a threshold number of the multiple downlink data transmissions being at least at the one or more threshold values.

8. The apparatus of claim 7, wherein the one or more processors are further configured to cause the apparatus to receive, from the base station, a configuration indicating at least one of the threshold number of the multiple downlink data transmissions or a number representing the multiple downlink data transmissions.

9. The apparatus of claim 1, wherein the one or more processors are configured to cause the apparatus to receive a configuration indicating a time period after which to transmit the SRS to the base station, and wherein transmitting the SRS comprises transmitting the SRS to the base station over the uplink resources occurring after the time period from receiving the one or more downlink data transmissions.

10. The apparatus of claim 1, wherein comparing the one or more parameter values includes comparing at least one of a number of negative acknowledged code blocks (CBs), a ratio between the negative acknowledged CBs over a total number of CBs, a number of negative acknowledged code block groups (CBGs), or a ratio between the negative acknowledged CBGs over a total number of CBGs, of the one or more downlink data transmissions to the one or more threshold values.

11. The apparatus of claim 1, wherein the one or more processors are configured to cause the apparatus to transmit the SRS on a same bandwidth part (BWP) of the one or more downlink data transmissions.

12. The apparatus of claim 1, wherein the one or more processors are configured to cause the apparatus to transmit the SRS based on a first configuration that is different from a second configuration received from the base station that configures transmission of aperiodic SRS.

13. The apparatus of claim 1, wherein the one or more downlink data transmissions are received in resources of one or more dynamic grants or a same semi-persistent scheduling (SPS) configuration.

14. The apparatus of claim 1, wherein the one or more downlink data transmissions include at least a first downlink data transmission received in first resources of a first semi-persistent scheduling (SPS) configuration and at least a second downlink data transmission received in second resources of a second SPS configuration.

15. The apparatus of claim 14, wherein the one or more downlink data transmissions further include at least a third downlink data transmission received in third resources of a dynamic grant.

16. The apparatus of claim 1, wherein the one or more processors are further configured to cause the apparatus to receive, from a base station, an indication to compare, to the one or more threshold values, the one or more parameter values of either downlink data transmissions received in resources of a same semi-persistent scheduling (SPS) configuration or downlink data transmissions received in resources of multiple SPS configurations.

17. The apparatus of claim 1, wherein the one or more processors are further configured to cause the apparatus to receive, from the base station a configuration including one or more parameters related to transmitting the SRS, wherein the one or more parameters include at least one of a resource density or a comb level for transmitting the SRS.

18. The apparatus of claim 1, wherein the one or more processors are further configured to cause the apparatus to receive, from the base station a configuration including one or more parameters related to a number of repetitions of the SRS to transmit, wherein the one or more processors are configured to cause the apparatus to transmit the number of repetitions of the SRS over a period of time based on the one or more parameters.

19. An apparatus for wireless communication, comprising:
a transceiver;
memory configured to store instructions; and
one or more processors communicatively coupled with the memory and the transceiver, wherein the one or more processors are configured to cause the apparatus to:
transmit one or more downlink data transmissions to a user equipment (UE);
receive, from the UE, feedback related to decoding the one or more downlink data transmissions, wherein the feedback includes an indication that the UE is transmitting, based on one or more parameters resulting from decoding the one or more downlink data transmissions, a sounding reference signal (SRS), wherein the one or more parameter values comprising a decoding status of the one or more downlink data transmissions, and wherein the decoding status results in a negative-acknowledgement (NACK) feedback value, and wherein the indication that the UE is transmitting the SRS comprises a NACK feedback value indicating that the UE is to transmit the SRS; and
receive, based on the indication, the SRS from the UE over uplink resources.

20. The apparatus of claim 19, wherein the one or more processors are further configured to cause the apparatus to transmit, to the UE, a configuration indicating one or more threshold values for determining to transmit the SRS.

21. The apparatus of claim 19, wherein the one or more downlink data transmissions include multiple downlink data transmissions, and wherein the feedback for the multiple downlink data transmissions indicates that the UE is transmitting the SRS for at least a portion of the multiple downlink data transmissions.

22. The apparatus of claim 21, wherein the one or more processors are further configured to cause the apparatus to transmit, to the UE, a configuration indicating at least one of a threshold number of the multiple downlink data transmissions or a number representing the multiple downlink data transmissions.

23. The apparatus of claim 22, wherein the configuration further indicates a time period after which to transmit the SRS to the apparatus, and wherein receiving the SRS is based on determining the uplink resources for receiving the SRS occurring after the time period from receiving the multiple downlink data transmissions.

24. The apparatus of claim 19, wherein the one or more processors are configured to interpret the NACK feedback value as the indication that the UE is to transmit the SRS based on a number of negative acknowledged code blocks (CBs), a ratio between the negative acknowledged CBs over a total number of CBs, a number of negative acknowledged code block groups (CBGs), or a ratio between the negative acknowledged CBGs over a total number of CBGs, of the one or more downlink data transmissions.

25. The apparatus of claim 19, wherein the one or more processors are configured to cause the apparatus to receive the SRS on a same bandwidth part (BWP) of the one or more downlink data transmissions.

26. A method for wireless communication at a user equipment (UE), comprising:
   receiving one or more downlink data transmissions from a base station; and
   transmitting, based on comparing one or more parameter values, resulting from decoding the one or more downlink data transmissions, to one or more threshold values, an indication of transmitting a sounding reference signal (SRS) to the base station, wherein the one or more parameter values comprises a decoding status of the one or more downlink data transmissions and the decoding status resulting in a negative-acknowledgement (NACK) feedback value; and
   transmitting, based on the comparing, the SRS to the base station over uplink resources.

27. The method of claim 26, wherein comparing the one or more parameter values includes comparing at least one of a number of negative acknowledged code blocks (CBs), a ratio between the negative acknowledged CBs over a total number of CBs, a number of negative acknowledged code block groups (CBGs), or a ratio between the negative acknowledged CBGs over a total number of CBGs, of the one or more downlink data transmissions to the one or more threshold values.

28. A method for wireless communication at a base station, comprising:
   transmitting one or more downlink data transmissions to a user equipment (UE);
   receiving, from the UE, feedback related to decoding one or more downlink data transmissions, wherein the feedback includes an indication that the UE is transmitting, based on one or more parameters resulting from decoding the one or more downlink data transmissions, a sounding reference signal (SRS), wherein the one or more parameter values comprising a decoding status of the one or more downlink data transmissions, and wherein the decoding status results in a negative-acknowledgement (NACK) feedback value, and wherein the indication that the UE is transmitting the SRS comprises a NACK feedback value indicating that the UE is to transmit the SRS; and
   receiving, based on the indication, the SRS from the UE over uplink resources.

29. The method of claim 28, further comprising interpreting the NACK feedback value as the indication that the UE is to transmit the SRS based on a number of negative acknowledged code blocks (CBs), a ratio between the negative acknowledged CBs over a total number of CBs, a number of negative acknowledged code block groups (CBGs), or a ratio between the negative acknowledged CBGs over a total number of CBGs, of the one or more downlink data transmissions.

* * * * *